(12) United States Patent
Wang et al.

(10) Patent No.: US 12,471,115 B2
(45) Date of Patent: Nov. 11, 2025

(54) INFORMATION TRANSMISSION PROCESSING METHOD AND DEVICE, AND USER EQUIPMENT

(71) Applicant: DATANG MOBILE COMMUNICATIONS EQUIPMENT CO., LTD., Beijing (CN)

(72) Inventors: Junwei Wang, Beijing (CN); Lei Wang, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 344 days.

(21) Appl. No.: 18/248,098

(22) PCT Filed: Oct. 20, 2021

(86) PCT No.: PCT/CN2021/124927
§ 371 (c)(1),
(2) Date: Apr. 6, 2023

(87) PCT Pub. No.: WO2022/083625
PCT Pub. Date: Apr. 28, 2022

(65) Prior Publication Data
US 2023/0413286 A1    Dec. 21, 2023

(30) Foreign Application Priority Data
Oct. 23, 2020    (CN) .......................... 202011149098.9

(51) Int. Cl.
*H04W 72/14*    (2009.01)
*H04L 5/00*    (2006.01)
(Continued)

(52) U.S. Cl.
CPC ......... *H04W 72/232* (2023.01); *H04L 5/0053* (2013.01); *H04L 25/03866* (2013.01); *H04W 72/1273* (2013.01)

(58) Field of Classification Search
CPC ............. H04L 5/0053; H04L 25/03866; H04L 1/1822; H04L 1/1896; H04L 5/0037;
(Continued)

(56) References Cited

U.S. PATENT DOCUMENTS 11,129,152 B2 *  9/2021  You ........................ H04L 5/0053
2010/0067468 A1  3/2010  Ho et al.
(Continued)

FOREIGN PATENT DOCUMENTS

CN    109952807 A    6/2019
CN    111641482 A    9/2020
(Continued)

OTHER PUBLICATIONS

Ericsson, "Introduction of shortened TTI and processing time for LTE," 3GPP TSG-RAN2 Meeting #102, R2-1807303, May 21, 2018; (Year: 2018).*
(Continued)

*Primary Examiner* — Lan-Huong Truong
(74) *Attorney, Agent, or Firm* — Harness, Dickey & Pierce, P.L.C.

(57) ABSTRACT

An information transmission processing method, an information transmission processing device and a UE are provided. The information transmission processing method includes: obtaining first DCI and first information, the first DCI including a first NDI; determining that the first NDI has been toggled in the case that the first information meets a first condition; and determining the first NDI to have not been toggled in the case that the first information meets a second condition. The first information includes at least one of: a first scrambling RNTI type of the first DCI; a second scrambling RNTI type of second DCI; a value of the first NDI in the first DCI; or a value of a second NDI in the second DCI.

11 Claims, 3 Drawing Sheets

PDCCH scheduling signaling DCI scrambled with C-RNTI (referred to as C-RNTI signaling)

PDCCH scheduling signaling DCI scrambled with G-RNTI (referred to as G-RNTI signaling)

U unicast data

M multicast data (51) Int. Cl.
   *H04L 25/03*       (2006.01)
   *H04W 72/1273*     (2023.01)
   *H04W 72/232*      (2023.01)

(58) Field of Classification Search
   CPC .. H04L 5/0091; H04L 5/0055; H04W 72/232; H04W 72/1273; H04W 92/10; H04W 72/23; H04W 72/30
   See application file for complete search history.

(56) References Cited

U.S. PATENT DOCUMENTS

| | | |
|---|---|---|
| 2010/0296454 A1 | 11/2010 | Park et al. |
| 2013/0182653 A1 | 7/2013 | Earnshaw et al. |
| 2018/0049060 A1* | 2/2018 | Fujishiro ............... H04W 72/30 |
| 2018/0110084 A1 | 4/2018 | Dinan et al. |
| 2019/0349971 A1 | 11/2019 | Yu et al. |
| 2020/0008097 A1 | 1/2020 | Fujishiro et al. |
| 2020/0288483 A1 | 9/2020 | Shi |
| 2021/0266953 A1* | 8/2021 | Pelletier ............ H04W 72/1268 |
| 2023/0188948 A1 | 6/2023 | Zhu et al. |

FOREIGN PATENT DOCUMENTS

| | | | |
|---|---|---|---|
| EP | 3723313 A1 * | 10/2020 | ........... H04L 1/1822 |
| JP | 2011-512081 A | 4/2011 | |
| JP | 2023-536194 A | 8/2023 | |
| WO | 2019/246285 A1 | 12/2019 | |
| WO | 2020/001579 A1 | 1/2020 | |
| WO | 2020/168235 A1 | 8/2020 | |
| WO | 2022/027415 A1 | 2/2022 | |

OTHER PUBLICATIONS

Office Action issued Feb. 6, 2024 in Japanese Applicaton No. 2023-524713.
Extended European Search Report issued Feb. 21, 2024 in European Application No. 21882040.5.
First Office Action issued Oct. 31, 2024 in Chinese Application No. 202011149098.
Ericsson, "Introduction of shortened TTI and processing time for LTE," 3GPP TSG-RAN2 Meeting #102, R2-1807303, May 21, 2018.

* cited by examiner

INFORMATION TRANSMISSION PROCESSING METHOD AND DEVICE, AND USER EQUIPMENT

CROSS-REFERENCE TO RELATED APPLICATION

This application claims a priority of the Chinese patent application No. 202011149098.9 filed in China on Oct. 23, 2020, which is incorporated herein by reference in its entirety.

TECHNICAL FIELD

The present disclosure relates to the field of communication technology, in particular to an information transmission processing method, an information transmission processing device, and a User Equipment (UE).

BACKGROUND

In order to enable a base station to schedule a Multicast Broadcast Service (MBS) flexibly and ensure the reliable transmission of MBS service data, a flexible initial transmission and retransmission scheduling mechanism is supported when an MBS Physical Downlink Shared Channel (PDSCH) is scheduled by the base station. In other words, both the initial transmission and the retransmission are scheduled by Downlink Control Information (DCI) scrambled with a Group common Radio Network Temporary Identity (G-RNTI) or DCI scrambled with a Cell specific Radio Network Temporary Identity (C-RNTI).

During the scheduling of the initial transmission and retransmission, when the G-RNTI and the C-RNTI are supported to be used together, it is impossible for a UE to accurately determine whether the data is transmitted initially or retransmitted because a same Transport Block (TB) is scheduled using different RNTIs.

SUMMARY

An object of the present disclosure is to provide an information transmission processing method, an information transmission processing device, and a UE, so as to solve the problem in the related art where it is unable for the UE to accurately determine whether the data is transmitted initially or retransmitted when a same TB is scheduled by DCI scrambled with different types of RNTIs.

In one aspect, the present disclosure provides in some embodiments an information transmission processing method for a UE, including: obtaining first DCI and first information, the first DCI including a first New Data Indicator (NDI); determining that the first NDI has been toggled in the case that the first information meets a first condition; and determining that the first NDI has not been toggled in the case that the first information meets a second condition. The first information includes at least one of: a first scrambling RNTI type of the first DCI; a second scrambling RNTI type of second DCI, the second DCI being DCI received before the first DCI; a value of the first NDI in the first DCI; or a value of a second NDI in the second DCI.

In a possible embodiment of the present disclosure, in the case that the first scrambling RNTI type is C-RNTI and the second scrambling RNTI type is C-RNTI, or the first scrambling RNTI type is G-RNTI and the second scrambling RNTI type is C-RNTI, or the first scrambling RNTI type is C-RNTI and the second scrambling RNTI type is G-RNTI, the first condition includes at least one of that the value of the first NDI is different from the value of the second NDI, or that a size of a first TB scheduled by the first DCI is different from a size of a second TB scheduled by the second DCI, and the second condition includes one of that the value of the first NDI is the same as the value of the second NDI, or that the value of the first NDI is the same as the value of the second NDI and the size of the first TB is the same as the size of the second TB.

In a possible embodiment of the present disclosure, the first condition includes one of that a type of data scheduled by the first DCI is different from a type of data scheduled by the second DCI, or that the type of the data scheduled by the first DCI is the same as the type of the data scheduled by the second DCI and the value of the first NDI is different from the value of the second NDI, and the second condition includes that the type of the data scheduled by the first DCI is the same as the type of the data scheduled by the second DCI and the value of the first NDI is the same as the value of the second NDI.

In a possible embodiment of the present disclosure, a type of data scheduled by DCI is indicated through the DCI, and/or determined in accordance with a scrambling RNTI type of the DCI.

In a possible embodiment of the present disclosure, in the case that the scrambling RNTI type of the DCI is C-RNTI and the DCI includes type indication information, the type of the data scheduled by the DCI is determined in accordance with the type indication information.

In a possible embodiment of the present disclosure, the first condition includes that the first scrambling RNTI type is G-RNTI, the second scrambling RNTI type is C-RNTI, and at least one NDI is toggled during a period that is from a time when third DCI is received to a time when the first DCI is received, and the third DCI is DCI scrambled with the G-RNTI and received before the first DCI. The second condition includes that the first scrambling RNTI type is G-RNTI, the second scrambling RNTI type is C-RNTI, and no NDI is toggled during the period that is from the time when the third DCI is received to the time when the first DCI is received.

In another aspect, the present disclosure provides in some embodiments a UE, including a memory, a transceiver and a processor. The memory is configured to store therein a program instruction. The transceiver is configured to transmit and receive data under the control of the processor. The processor is configured to read the program instruction in the memory so as to: obtain first DCI and first information, the first DCI including a first NDI; determine that the first NDI has been toggled in the case that the first information meets a first condition; and determine that the first NDI has not been toggled in the case that the first information meets a second condition. The first information includes at least one of: a first scrambling RNTI type of the first DCI; a second scrambling RNTI type of second DCI, the second DCI being DCI received before the first DCI; a value of the first NDI in the first DCI; or a value of a second NDI in the second DCI.

In a possible embodiment of the present disclosure, in the case that the first scrambling RNTI type is C-RNTI and the second scrambling RNTI type is C-RNTI, or the first scrambling RNTI type is G-RNTI and the second scrambling RNTI type is C-RNTI, or the first scrambling RNTI type is C-RNTI and the second scrambling RNTI type is G-RNTI, the first condition includes at least one of that the value of the first NDI is different from the value of the second NDI, or that a size of a first TB scheduled by the first DCI is different from a size of a second TB scheduled by the second DCI, and the second condition includes one of that the value of the first NDI is the same as the value of the second NDI, or that the value of the first NDI is the same as the value of the second NDI and the size of the first TB is the same as the size of the second TB.

In a possible embodiment of the present disclosure, the first condition includes one of that a type of data scheduled by the first DCI is different from a type of data scheduled by the second DCI, or that the type of the data scheduled by the first DCI is the same as the type of the data scheduled by the second DCI and the value of the first NDI is different from the value of the second NDI, and the second condition includes that the type of the data scheduled by the first DCI is the same as the type of the data scheduled by the second DCI and the value of the first NDI is the same as the value of the second NDI.

In a possible embodiment of the present disclosure, a type of data scheduled by DCI is indicated through the DCI, and/or determined in accordance with a scrambling RNTI type of the DCI.

In a possible embodiment of the present disclosure, in the case that the scrambling RNTI type of the DCI is C-RNTI and the DCI includes type indication information, the type of the data scheduled by the DCI is determined in accordance with the type indication information.

In a possible embodiment of the present disclosure, the first condition includes that the first scrambling RNTI type is G-RNTI, the second scrambling RNTI type is C-RNTI, and at least one NDI is toggled during a period that is from a time when third DCI is received to a time when the first DCI is received, and the third DCI is DCI scrambled with the G-RNTI and received before the first DCI. The second condition includes that the first scrambling RNTI type is G-RNTI, the second scrambling RNTI type is C-RNTI, and no NDI is toggled during the period that is from the time when the third DCI is received to the time when the first DCI is received.

In yet another aspect, the present disclosure provides in some embodiments an information transmission processing device, including: an obtaining module configured to obtain first DCI and first information, the first DCI including a first NDI; a first processing module configured to determine that the first NDI has been toggled in the case that the first information meets a first condition; and a second processing module configured to determine that the first NDI has not been toggled in the case that the first information meets a second condition. The first information includes at least one of: a first scrambling RNTI type of the first DCI; a second scrambling RNTI type of second DCI, the second DCI being DCI received before the first DCI; a value of the first NDI in the first DCI; or a value of a second NDI in the second DCI.

In still yet another aspect, the present disclosure provides in some embodiments a processor-readable storage medium storing therein a program instruction. The program instruction is executed by a processor to implement the above-mentioned information transmission processing method.

The present disclosure at least has the following beneficial effects.

According to the embodiments of the present disclosure, the first DCI and first information are obtained, and the first DCI includes the first NDI. The first NDI is determined to be toggled in the case that the first information meets the first condition, and the first NDI is determined to be not toggled in the case that the first information meets the second condition. The first information includes at least one of: the first scrambling RNTI type of the first DCI; the second scrambling RNTI type of the second DCI, the second DCI being DCI received before the first DCI; the value of the first NDI in the first DCI; or the a value of the second NDI in the second DCI. As a result, it is able to schedule the data using the DCI scrambled with different types of RNTIs in a more flexible and efficient manner, thereby to enable the UE to determine whether the data is transmitted initially or retransmitted in an accurate manner. In addition, it is able to utilize air-interface resources efficiently, thereby to improve the spectrum utilization.

DETAILED DESCRIPTION

The expression "and/or" in the embodiments of the present disclosure may be merely used to describe the relationship between objects, and it may include three relationships. For example, "A and/or B" may represent that, there is only A, there are both A and B, and there is only B. Further, the symbol "/" usually refers to "or".

The expression "plurality of" refers to two or more, and the other quantifiers are similar.

The present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

An MBS PDSCH scheduling method and a method for determining whether data is transmitted initially or retransmitted in Point To Point (PTP) data transmission will be described briefly at first.

1. G-RNTI Group Scheduling

Group scheduling is also called as Point To Multi-point (PTM) scheduling, and one scheduling signaling is used.

To be specific, a base station transmits scheduling signaling DCI on a Physical Downlink Control Channel (PDCCH) to schedule a data channel PDSCH, and the DCI is scrambled with a Cyclic Redundancy Check (CRC) using a G-RNTI.

A scrambling code sequence for scrambling the scheduled data channel PDSCH is generated in accordance with the G-RNTI.

Correspondingly, a group of User Equipments (UEs) (the group includes a plurality of UEs) receive the PDCCH scrambled with the G-RNTI, and receive the PDSCH scrambled in accordance with the G-RNTI.

2. C-RNTI Unicast Scheduling

Unicast scheduling is also called as PTP scheduling, a UE-specific PDCCH is used for a scheduling instruction, and a data channel is a UE-specific PDSCH.

To be specific, for each UE, the base station transmits scheduling signaling DCI on the PDCCH to schedule the data channel PDSCH, and the DCI is scrambled with CRC using a C-RNTI.

A scrambling code sequence for scrambling the scheduled data channel PDSCH is generated in accordance with the G-RNTI or the C-RNTI.

Correspondingly, each UE merely receives the scheduling signaling transmitted by the base station to the UE itself, and receives the PDSCH in accordance with the scheduling signaling.

In the unicast scheduling, i.e., PTP scheduling, retransmission is performed in a Hybrid Automatic Repeat reQuest (HARQ) process number, and whether data is transmitted initially or retransmitted is indicated through an NDI. To be specific, whether the NDI in the DCI scrambled with the C-RNTI is toggled is determined as follows.

1) Determining Whether the NDI is Toggled

To be specific, a) when the scheduling information is received for the first time, the NDI is directly determined to be toggled.

b) When the scheduling information is signaling which is scheduled by a CS-RNTI and was received previously or the scheduling is configured through high-layer signaling, the NDI is directly determined to be toggled, regardless of a specific value of the NDI.

c) When the scheduling information is not received for the first time, a value of the received NDI is compared with a value of the previous NDI. When the values are different, the NDI is determined to be toggled; otherwise, the NDI is determined to be not toggled.

2) Determining Whether the Data is Initially Transmitted or Retransmitted in Accordance with the NDI When the NDI is toggled, the data is determined to be transmitted initially, and when the NDI is not toggled, the data is determined to be retransmitted.

It should be appreciated that, when the UE determines that the data is transmitted initially, received PDSCH data is not combined with any cached data, and instead, it is demodulated and decoded individually. When the UE determines that the data is retransmitted, the received PDSCH data is combined with the cached data for a same HARQ process, and then demodulated and decoded.

However, for the initial transmission and retransmission in the HARQ process, the above-mentioned method for determining whether the NDI is toggled is merely adapted to the UE-specific RNTI, i.e., DCI scrambled with the C-RNTI, rather than being adapted to the group scheduling where the DCI is scrambled with the G-RNTI or UE individual scheduling where DCI is scrambled with the C-RNTI. For the group scheduling where the DCI is scrambled with the G-RNTI or the UE individual scheduling where DCI is scrambled with the C-RNTI, when the above-mentioned method is still used to determine whether the NDI is toggled, an erroneous determination result may occur.

Figure 1:
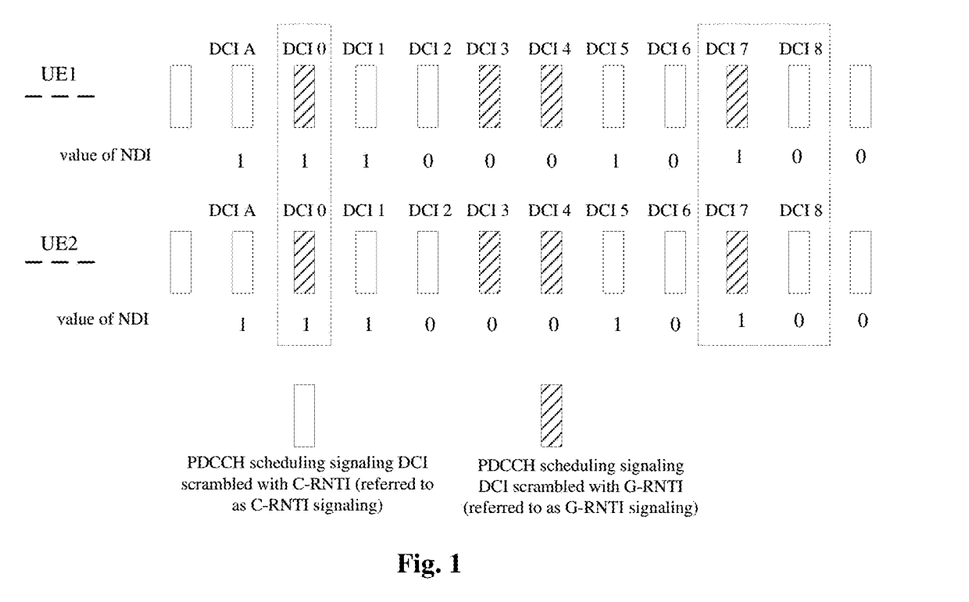
FIG. 1 is a schematic view showing a situation where an erroneous determination result occurs when determining whether an NDI is toggled in the related art.

As shown in FIG. 1, i) in DCI-0, the base station schedules a Multimedia Broadcast Service (MBS) PDSCH using the G-RNTI. This HARQ process number is not used before, so each of UE1 and UE2 uses its own values of the NDI, and the values of the NDI may be different before DCI-0. The G-RNTI scheduling is performed with respect to one group of UEs, so no matter whether the value of the NDI is set as 1 or 0, it may be the same as the value of the NDI for one of the UEs. In FIG. 1, 1 is used to transmit an initially-transmitted MBS PDSCH. For UE2, the NDI is toggled, so the MBS PDSCH is determined to be transmitted initially, as expected by the base station. However, for UE1, the NDI is not toggled, so the MBS PDSCH is determined to be retransmitted, and at this time, the determination result is wrong.

ii) In DCI-6, the base station schedules a unicast PDSCH scrambled with the C-RNTI; in DCI-7, the base station schedules the initially-transmitted MBS PDSCH scrambled with the G-RNTI; and in DCI-8, the base station schedules an initially-transmitted unicast PDSCH scrambled with the C-RNTI. Due to the missed detection of the UE in DCI-7, the transmission in DCI-8 is erroneously determined as the retransmission in DCI-6.

In order to accurately determine whether the NDI is toggled, specific HARQ process numbers are allocated for the scheduling of a multicast PDSCH (e.g., HARQ process numbers 1, 2 and 3 are merely used for the scheduling of an MBS), and the other process numbers (e.g., HARQ process numbers 4, 5, 6, 7 and 8) are allocated for the scheduling of a unicast PDSCH. However, the HARQ process numbers are allocated inflexibly.

An object of the present disclosure is to provide an information transmission processing method, an information transmission processing device, and a UE, so as to solve the above-mentioned problems. The method and the device are provided on the basis of a same inventive concept, and a principle of the method for solving the problem is similar to that of the device, so the implementation of the device may refer to that of the method.

Figure 2:
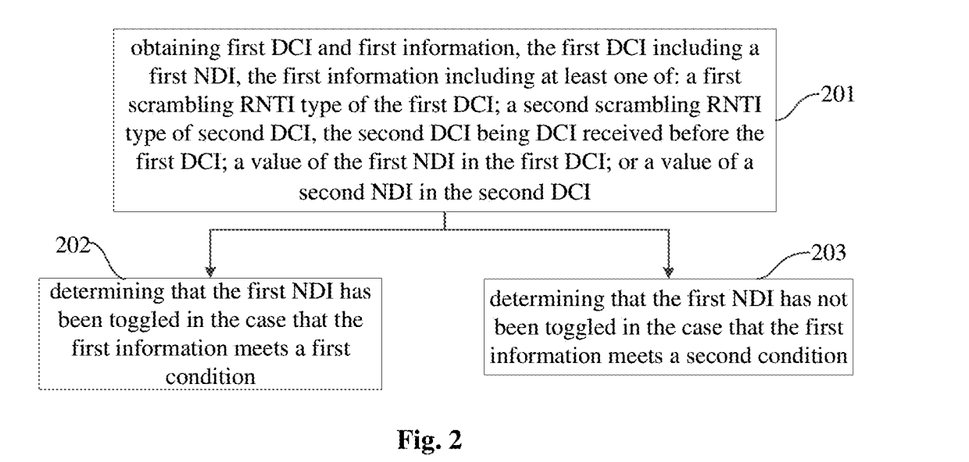
FIG. 2 is a flow chart of an information transmission processing method according to an embodiment of the present disclosure.

As shown in FIG. 2, the present disclosure provides in some embodiments an information transmission processing method for a UE, which includes the following steps.

Step 201: obtaining first DCI and first information, the first DCI including a first NDI.

The first information includes at least one of: a first scrambling RNTI type of the first DCI; a second scrambling RNTI type of second DCI, the second DCI being DCI received before the first DCI; a value of the first NDI in the first DCI; or a value of a second NDI in the second DCI.

In a possible embodiment of the present disclosure, the scrambling RNTI type is a C-RNTI or a G-RNTI.

In a possible embodiment of the present disclosure, the value of the NDI is 0 or 1.

Step 202: determining that the first NDI has been toggled in the case that the first information meets a first condition.

Step 203: determining that the first NDI has not been toggled in the case that the first information meets a second condition.

It should be appreciated that, subsequent to Step 202, the UE determines that data transmitted through a PDSCH is transmitted initially when the first NDI has been toggled, and subsequent to Step 203, the UE determines that the data transmitted through the PDSCH is retransmitted when the first NDI has not been toggled.

Here, when the first condition is not met, it means that the second condition is met. That is, in the case that the first information meets the first condition, the first NDI is determined to be toggled, and in the case that the first information does not meet the first condition, the first NDI is determined to be not toggled. In other words, in the case that the first information meets the first condition, the first NDI is determined to be toggled; otherwise, the first NDI is determined to be not toggled.

It should be appreciated that, usually the retransmission and initial transmission (also called as new transmission) of the data are generally considered as being performed in a same HARQ process, and the above-mentioned determination process is considered, by default, a process of determining whether the NDI is toggled in a same HARQ process number. In the embodiments of the present disclosure, commonly-used HARQ process numbers are scheduled for a unicast PDSCH and a multicast PDSCH, so it is able for a base station to schedule the data transmission more flexibly.

According to the information transmission processing method in the embodiments of the present disclosure, the first DCI and first information are obtained, and the first DCI includes the first NDI. The first NDI is determined to be toggled in the case that the first information meets the first condition, and the first NDI is determined to be not toggled in the case that the first information meets the second condition. The first information includes at least one of: the first scrambling RNTI type of the first DCI; the second scrambling RNTI type of the second DCI, the second DCI being DCI received before the first DCI; the value of the first NDI in the first DCI; or the a value of the second NDI in the second DCI. As a result, it is able to schedule the data using the DCI scrambled with different types of RNTIs in a more flexible and efficient manner, thereby to enable the UE to determine whether the data is transmitted initially or retransmitted in an accurate manner. In addition, it is able to utilize air-interface resources efficiently, thereby to improve the spectrum utilization.

In a possible embodiment of the present disclosure, in the case that the first scrambling RNTI type is C-RNTI and the second scrambling RNTI type is C-RNTI, or the first scrambling RNTI type is G-RNTI and the second scrambling RNTI type is C-RNTI, or the first scrambling RNTI type is C-RNTI and the second scrambling RNTI type is G-RNTI, the first condition includes at least one of that the value of the first NDI is different from the value of the second NDI, or that a size of a first TB scheduled by the first DCI is different from a size of a second TB scheduled by the second DCI, and the second condition includes one of that the value of the first NDI is the same as the value of the second NDI, or that the value of the first NDI is the same as the value of the second NDI and the size of the first TB is the same as the size of the second TB.

To be specific, in the case that the first scrambling RNTI type is C-RNTI and the second scrambling RNTI type is C-RNTI, the first condition includes at least one of: that the value of the first NDI is different from the value of the second NDI; or that the size of the first TB scheduled by the first DCI is different from the size of the second TB scheduled by the second DCI. The second condition includes that the value of the first NDI is the same as the value of the second NDI and the size of the first TB is the same as the size of the second TB.

Here, in such a circumstance where the first DCI (i.e., current DCI) is scrambled with a C-RNTI and the previously-received second DCI (i.e., DCI received immediately before the first DCI) is scrambled with the C-RNTI, when the value of the first NDI in the first DCI is different from the value of the second NDI in the second DCI and/or the size of the first TB scheduled by the first DCI is different from the size of the second TB scheduled by the second DCI, the first NDI is determined to be toggled; otherwise, the first NDI is determined to be not toggled.

In the case that the first scrambling RNTI type is G-RNTI and the second scrambling RNTI type is C-RNTI, the first condition includes that the value of the first NDI is different from the value of the second NDI, and the second condition includes that the value of the first NDI is the same as the value of the second NDI.

In the case that the first scrambling RNTI type is C-RNTI and the second scrambling RNTI type is G-RNTI, the first condition includes that the value of the first NDI is different from the value of the second NDI, and the second condition includes that the value of the first NDI is the same as the value of the second NDI.

In a possible embodiment of the present disclosure, the first condition includes one of that a type of data scheduled by the first DCI is different from a type of data scheduled by the second DCI, or that the type of the data scheduled by the first DCI is the same as the type of the data scheduled by the second DCI and the value of the first NDI is different from the value of the second NDI, and the second condition includes that the type of the data scheduled by the first DCI is the same as the type of the data scheduled by the second DCI and the value of the first NDI is the same as the value of the second NDI.

To be specific, a type of data scheduled by DCI is indicated through the DCI, and/or determined in accordance with a scrambling RNTI type of the DCI.

It should be appreciated that, in the case that the scrambling RNTI type of the DCI is G-RNTI, the type of the data scheduled by the DCI is determined as a first type. In other words, in the case that the scrambling RNTI type of the DCI is G-RNTI, the type of the data scheduled by the DCI is determined, by default, as the first type. In addition, in the case that the scrambling RNTI type of the DCI is G-RNTI, the type of the data scheduled by the DCI is determined as the first type in accordance with pre-agreement or pre-configuration. In a possible embodiment of the present disclosure, the first type is multicast, i.e., in the case that the scrambling RNTI type of the DCI is G-RNTI, the data scheduled by the DCI is multicast data.

Further, in the case that the scrambling RNTI type of the DCI is C-RNTI and the DCI includes type indication information, the type of the data scheduled by the DCI is determined in accordance with the type indication information.

In a possible embodiment of the present disclosure, in the case that the scrambling RNTI type of the DCI is C-RNTI, the type of the data scheduled by the DCI is determined as a second type. In other words, in the case that the scrambling RNTI type of the DCI is C-RNTI, the type of the data scheduled by the DCI is determined, by default, as the second type, on the premise that the scrambling RNTI type of the DCI is C-RNTI and the DCI does not include any type indication information. In a possible embodiment of the present disclosure, the second type is unicast, i.e., in the case that the scrambling RNTI type of the DCI is C-RNTI, the data scheduled by the DCI is unicast data.

It should be appreciated that, the type indication information is used to indicate the type of the data scheduled by the DCI.

To be specific, an indication field is added in the DCI scrambled with the C-RNTI for the type indication information, and the indication field has a size of N bits. For example, a 1-bit indication field is used to indicate whether the type of the data scheduled by the DCI is unicast or multicast. For example, when MBS-PDSCH-indication is 0, it means that the type of the data scheduled by the DCI is multicast, i.e., the data scheduled by the DCI is multicast data; and MBS-PDSCH-indication is 1, it means that the type of the data scheduled by the DCI is unicast, i.e., the data scheduled by the DCI is unicast data. It should be appreciated that, the above is merely for illustrative purposes. Here, when contents of the indication fields added in the DCI are the same, e.g., are all 0 or 1, it means that the type of the data scheduled by the first DCI is the same as the type of the data scheduled by the second DCI; otherwise, the type of the data scheduled by the first DCI is different from the type of the data scheduled by the second DCI.

Based on the above, to be specific, the first condition includes that the first scrambling RNTI type of the first DCI is C-RNTI, the second scrambling RNTI type of the second DCI is C-RNTI, the first DCI includes first type indication information, the second DCI includes second type indication information, and a content of the first type indication information is different from a content of the second type indication information.

It should be appreciated that, when the content of the first type indication information is different from the content of the second type indication information, it means that the type of the data scheduled by the first DCI is different from the type of the data scheduled by the second DCI.

Here, such words as "first", "second", "third" and "fourth" are merely used to differentiate items from each other. Each of the first type indication information and the second type indication information is used to indicate the type of the data scheduled by the DCI, and its content is variable, e.g., 0 or 1.

Alternatively, the first condition includes that the first scrambling RNTI type of the first DCI is C-RNTI, the second scrambling RNTI type of the second DCI is C-RNTI, the first DCI includes first type indication information, the second DCI includes second type indication information, a content of the first type indication information is the same as a content of the second type indication information, and the value of the first NDI is different from the value of the second NDI.

It should be appreciated that, when the content of the first type indication information is the same as the content of the second type indication information, it means that the type of the data scheduled by the first DCI is the same as the type of the data scheduled by the second DCI.

Alternatively, the first condition includes that the first scrambling RNTI type of the first DCI is C-RNTI, the second scrambling RNTI type of the second DCI is C-RNTI, the first DCI does not include any first type indication information, the second DCI does not include any second type indication information, and the value of the first NDI is different from the value of the second NDI.

Here, in the case that the DCI does not include any type indication information, the type of the data scheduled by the DCI is determined in accordance with the scrambling RNTI type of the DCI. In such a circumstance where the first scrambling RNTI type of the first DCI is C-RNTI and the second scrambling RNTI type of the second DCI is C-RNTI, when the first DCI does not include the first type indication information, it means that the type of the data scheduled by the first DCI is unicast, and when the second DCI does not include the second type indication information, it means that the type of the data scheduled by the second DCI is unicast, i.e., the type of the data scheduled by the first DCI is the same as the type of the data scheduled by the second DCI.

Alternatively, the first condition includes that the first scrambling RNTI type of the first DCI is C-RNTI, the second scrambling RNTI type of the second DCI is C-RNTI, merely one of the first DCI and the second DCI includes third type indication information, and the third type indication information is used to indicate that the type of the data scheduled by the DCI is the first type.

Here, the third type indication information is used to indicate that the type of the data scheduled by the DCI is the first type. At this time, the third type indication information is constant, i.e., a content of the third type indication information is constant.

In a possible embodiment of the present disclosure, the first type is multicast. When merely one of the first DCI and the second DCI indicates that the type of the scheduled data is multicast and the other DCI does not include any type indication information, the type of the data scheduled by the other DCI is determined, by default, as unicast (because the scrambling RNTI type of the DCI is C-RNTI), i.e., the type of the data scheduled by the first DCI is different from the type of the data scheduled by the second DCI.

Alternatively, the first condition includes that the first scrambling RNTI type of the first DCI is C-RNTI, the second scrambling RNTI type of the second DCI is C-RNTI, merely one of the first DCI and the second DCI includes fourth type indication information, the fourth type indication information is used to indicate that the type of the data scheduled by the DCI is the second type, and the value of the first NDI is different from the value of the second NDI.

Here, based on the above analysis, the type of the data scheduled by the first DCI is the same as the type of the data scheduled by the second DCI.

Alternatively, the first condition includes that the first scrambling RNTI type of the first DCI is G-RNTI, and the second scrambling RNTI type of the second DCI is C-RNTI.

Alternatively, the first condition includes that the first scrambling RNTI type of the first DCI is G-RNTI, the second scrambling RNTI type of the second DCI is C-RNTI, the second DCI includes fifth type indication information, the fifth type indication information is used to indicate that the type of the data scheduled by the second DCI is the first type, and the value of the first NDI is different from the value of the second NDI.

Alternatively, the first condition includes that the first scrambling RNTI type of the first DCI is G-RNTI, the second scrambling RNTI type of the second DCI is C-RNTI, the second DCI includes sixth type indication information, and the sixth type indication information is used to indicate that the type of the data scheduled by the second DCI is the second type.

Alternatively, the first condition includes that the first scrambling RNTI type of the first DCI is G-RNTI, the second scrambling RNTI type of the second DCI is C-RNTI, and the second DCI does not include any type indication information.

Alternatively, the first condition includes that the first scrambling RNTI type of the first DCI is C-RNTI, the second scrambling RNTI type of the second DCI is G-RNTI, the first DCI includes seventh type indication information, the seventh type indication information is used to indicate that the type of the data scheduled by the first DCI is the first type, and the value of the first NDI is different from the value of the second DCI.

Alternatively, the first condition includes that the first scrambling RNTI type of the first DCI is C-RNTI, the second scrambling RNTI type of the second DCI is G-RNTI, the first DCI includes eighth type indication information, and the eighth type indication information is used to indicate that the type of the data scheduled by the first DCI is the second type.

Alternatively, the first condition includes that the first scrambling RNTI type of the first DCI is G-RNTI, the second scrambling RNTI type of the second DCI is G-RNTI, and the value of the first NDI is different from the value of the second NDI.

The second condition includes one of: that the first scrambling RNTI of the first DCI is C-RNTI, the second scrambling RNTI type of the second DCI is C-RNTI, the first DCI includes the first type indication information, the second DCI includes the second type indication information, the content of the first type indication information is the same as the second type indication information, and the value of the first NDI is the same as the value of the second NDI; that the first scrambling RNTI type of the first DCI is C-RNTI, the second scrambling RNTI type of the second DCI is C-RNTI, the first DCI does not include any first type indication information, the second DCI does not include any second type indication information, and the value of the first NDI is the same as the value of the second NDI; that the first scrambling RNTI type of the first DCI is C-RNTI, the second scrambling RNTI type of the second DCI is C-RNTI, merely one of the first DCI and the second DCI includes the fourth type indication information, the fourth type indication information is used to indicate that the type of the data scheduled by the DCI is the second type, and the value of the first NDI is the same as the value of the second NDI; that the first scrambling RNTI type of the first DCI is G-RNTI, the second scrambling RNTI type of the second DCI is C-RNTI, the second DCI includes the fifth type indication information, the fifth type indication information is used to indicate that the type of the data scheduled by the second DCI is the first type, and the value of the first NDI is the same as the value of the second NDI; that the first scrambling RNTI type of the first DCI is C-RNTI, the second scrambling RNTI type of the second DCI is G-RNTI, the first DCI includes seventh type indication information, the seventh type indication information is used to indicate that the type of the data scheduled by the first DCI is the first type, and the value of the first NDI is the same as the value of the second NDI; or that the first scrambling RNTI type of the first DCI is G-RNTI, the second scrambling RNTI type of the second DCI is G-RNTI, and the value of the first NDI is the same as the value of the second NDI.

Here, in a circumstance where the first DCI (i.e., current DCI) is scrambled with the C-RNTI and the previously-received second DCI (i.e., DCI received immediately before the first DCI) is scrambled with the C-RNTI, when the type of the data scheduled by the first DCI is different from the type of the data scheduled by the second DCI, the first NDI is determined to be toggled, regardless of the value of the NDI; and when the type of the data scheduled by the first DCI is the same as the type of the data scheduled by the second DCI, whether the first NDI has been toggled is determined in accordance with the value of the first NDI and the value of the second NDI. To be specific, when the value of the first NDI is different from the value of the second NDI, the first NDI is determined to be toggled, and when the value of the first NDI is the same as the value of the second NDI, the first NDI is determined to be not toggled.

Here, for a same HARQ process number, in a circumstance where the first DCI (i.e., current DCI) is scrambled with the G-RNTI and the previously-received second DCI (i.e., DCI received immediately before the first DCI) is scrambled with the C-RNTI, the first NDI is directly determined to be toggled, regardless of the value of the NDI.

The scrambling RNTI type of the first DCI is G-RNTI, so the type of the data scheduled by the first DCI is determined, by default, as the first type, i.e., multicast. The scrambling RNTI type of the second DCI is C-RNTI, so the type of the data scheduled by the second DCI is determined, by default, as the second type, i.e., unicast. In other words, when the type of the data scheduled by the first DCI is different from the type of the data scheduled by the second DCI, the first NDI is determined to be toggled.

For a same HARQ process number, in a circumstance where the first DCI (i.e., current DCI) is scrambled with the G-RNTI and the previously-received second DCI (i.e., DCI received immediately before the first DCI) is scrambled with the C-RNTI, when the second DCI includes the type indication information (i.e., the fifth type indication information) indicating that the type of the data scheduled by the second DCI is the first type, whether the first NDI has been toggled is determined in accordance with the value of the first NDI and the value of the second NDI (here, when the values are the same, the first NDI has not been toggled, and when the values are different, the first NDI has been toggled). When the second DCI includes the type indication information (i.e., the sixth type indication information) indicating that the type of the data scheduled by the second DCI is the second type or the second DCI does not include any type indication information, the first NDI is determined to be toggled.

It should be appreciated that, for a same HARQ process number, in a circumstance where the first DCI (i.e., current DCI) is scrambled with the G-RNTI and the previously-received second DCI (i.e., DCI received immediately before the first DCI) is scrambled with the C-RNTI, when the second DCI does not include any type indication information (e.g., MBS-PDSCH-indication), a plurality of DCI formats is configured by the base station for scheduling the data transmission for the UE, and the MBS-PDSCH-indication field is configured merely for some special formats.

In a possible embodiment of the present disclosure, the first condition includes that the first scrambling RNTI type is G-RNTI, the second scrambling RNTI type is C-RNTI, and at least one NDI is toggled during a period that is from a time when third DCI is received to a time when the first DCI is received, and the third DCI is DCI scrambled with the G-RNTI and received before the first DCI. The second condition includes that the first scrambling RNTI type is G-RNTI, the second scrambling RNTI type is C-RNTI, and no NDI is toggled during the period that is from the time when the third DCI is received to the time when the first DCI is received.

For a same HARQ process number, in a circumstance where the first DCI (i.e., current DCI) is scrambled with the G-RNTI and the previously-received second DCI (i.e., DCI received immediately before the first DCI) is scrambled with the C-RNTI, when the values of the NDIs for all the DCI within the range from the previous DCI scrambled with the G-RNTI (the third DCI) to the first DCI scrambled with the G-RNTI are different, the first NDI is determined to be toggled, and when the values of the NDIs are the same, the first NDI is determined to be not toggled. In other words, when any NDI is toggled during the period from the time when the previous DCI scrambled with the G-RNTI is received to the time when the first DCI scrambled with the current G-RNTI is received, the first NDI is determined to be toggled; otherwise, the first NDI is determined to be not toggled.

The implementation of the information transmission processing method will be described hereinafter in conjunction with three embodiments.

First Embodiment

For a same HARQ process number, upon the receipt of the first DCI scrambled with the G-RNTI, when the previously-received second DCI is scrambled with the C-RNTI, the NDI in the first DCI is determined to be toggled. When the previously-received second DCI is scrambled with the G-RNTI, the value of the NDI in the first DCI is compared with the value of the NDI in the second DCI. When the value of the NDI in the first DCI is the same as the value of the NDI in the second DCI, the NDI in the first DCI is determined to be not toggled; otherwise, the NDI in the first DCI is determined to be toggled.

For a same HARQ process number, upon the receipt of the first DCI scrambled with the C-RNTI, when the previously-received second DCI is scrambled with the C-RNTI, and the value of the NDI in the first DCI is different from the value of the NDI in the second DCI and/or the size of the TB scheduled by the first DCI is different from the size of the TB scheduled by the second DCI, the NDI in the first DCI is determined to be toggled. When the value of the NDI in the first DCI is the same as the value of the NDI in the second DCI and the size of the TB scheduled by the first DCI is the same as the size of the TB scheduled by the second DCI, the NDI in the first DCI is determined to be not toggled.

When the previously-received second DCI is scrambled with the G-RNTI, the value of the NDI in the first DCI is compared with the value of the NDI in the second DCI. When the value of the NDI in the first DCI is the same as the value of the NDI in the second DCI, the NDI in the first DCI is determined to be not toggled; otherwise, the NDI in the first DCI is determined to be toggled.

Based on the above-mentioned method, it is able for the UE to easily determine whether the NDI is toggled.

Figure 3:
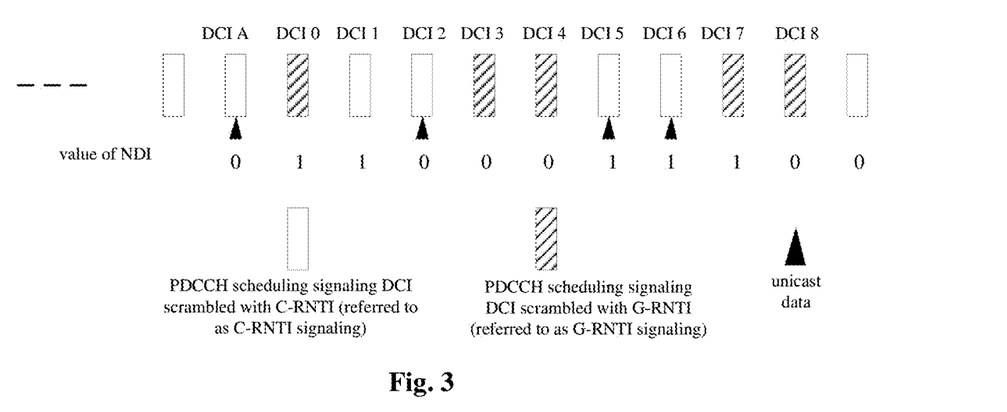
FIG. 3 is a schematic view showing an application example of the information transmission processing method according to an embodiment of the present disclosure.

For example, as shown in FIG. 3, in DCI-A/DCI-2/DCI-5/DCI-6, unicast service data is scheduled by the base station, and in the other DCI, multicast service data is scheduled by the base station.

The following DCI is scheduling signaling scrambled with the G-RNTI, and whether the NDI is toggled is determined as follows using the above-mentioned method.

DCI-0: the previous DCI is C-RNTI scheduling signaling, so the NDI is directly determined to be toggled.

DCI-3: the previous DCI is C-RNTI scheduling signaling, so the NDI is directly determined to be toggled.

DCI-4: the previous DCI is G-RNTI scheduling signaling, and the values of the NDIs are the same, so the NDI is determined to be not toggled.

DCI-7: the previous DCI is C-RNTI scheduling signaling, so the NDI is directly determined to be toggled.

DCI-8: the previous DCI is G-RNTI scheduling signaling, and the values of the NDIs are different, so the NDI is determined to be toggled.

Identically, the following DCI is scheduling signaling scrambled with the C-RNTI, and whether the NDI is toggled is determined as follows using the above-mentioned method (in DCI-0/DCI-1, missed detection occurs for the UE, and the data is transmitted initially through DCI-2).

DCI-2: the previous DCI is C-RNTI scheduling signaling (DCI for DCI-A), the value of the NDI is the same as the value of the NDI in DCI-A (both 0), but the lengths of the TBs are different, so the NDI is determined to be toggled.

It should be appreciated that, the base station expects to schedule the initial transmission of the unicast data through DCI-2, and in order to prevent the occurrence of missed detection for the UE through DCI-0/DCI-1, a TB scheduled by DCI-2 and a TB scheduled by DCI-A should be set to be different from each other.

DCI-5: the previous DCI is G-RNTI scheduling signaling, and the value of the NDI is different from the value of the NDI in DCI-4, so the NDI is determined to be toggled.

DCI-6: the previous DCI is C-RNTI scheduling signaling, the value of the NDI is the same as the value of the NDI in DCI-, and the lengths of the TB s are the same, so the NDI is determined to be not toggled.

Second Embodiment

For a same HARQ process number, upon the receipt of the first DCI scrambled with the G-RNTI, when the previously-received second DCI is scrambled with the C-RNTI, whether the NDI is toggled is determined during a period from a time when the DCI scrambled with the G-RNTI was received previously to a time when the first DCI is received. When the NDI is toggled, the NDI in the first DCI is determined to be toggled. When the NDI is not toggled, the NDI in the first DCI is determined to be not toggled.

When the previously-received second DCI is scrambled with the G-RNTI, the value of the NDI in the first DCI is compared with the value of the NDI in the second DCI. When the values are the same, the NDI in the first DCI is determined to be not toggled, and when the values are different, the NDI in the first DCI is determined to be toggled.

For a same HARQ process number, upon the receipt of the first DCI scrambled with the C-RNTI, when the previously-received second DCI is scrambled with the C-RNTI, a specific determination process is the same as that mentioned in the first embodiment, and thus will not be repeatedly defined herein.

When the previously-received second DCI is scrambled with the G-RNTI, a specific determination process is the same as that mentioned in the first embodiment, and thus will not be repeatedly defined herein.

Based on the method mentioned hereinabove, it is able to schedule the data retransmission in accordance with the C-RNTI, and then schedule the data retransmission in accordance with the G-RNTI again.

Figure 4:
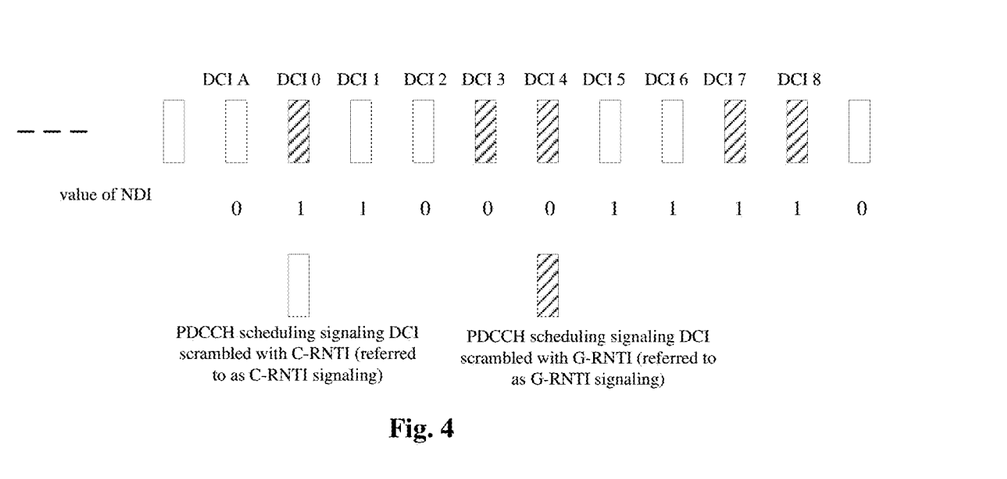
FIG. 4 is a schematic view showing another application example of the information transmission processing method according to an embodiment of the present disclosure.

For example, as shown in FIG. 4, the following DCI is scheduling signaling scrambled with the G-RNTI, and whether the NDI is toggled is determined as follows using the above-mentioned method.

DCI-0: the DCI is G-RNTI scheduling signaling received for the first time, so the NDI is directly determined to be toggled.

DCI-3: the previous DCI is G-RNTI scheduling signaling, i.e., DCI-0, and the NDI was toggled during the period between DCI-0 and DCI-3, so the NDI is determined to be toggled.

It should be appreciated that, the MBS data is scheduled by the base station through DCI-2, and the data retransmission of the data in DCI-2 is scheduled by DCI-3. When the NDI is determined by the UE to be toggled, a combination gain is lost. Hence, the base station shall not schedule the initial transmission in accordance with the C-RNTI, and shall not schedule the retransmission in accordance with the G-RNTI.

DCI-4: the previous DCI is G-RNTI scheduling signaling, i.e., DCI-3, and the values of the NDIs are the same, so the NDI is determined to be not toggled.

DCI-7: the previous DCI is G-RNTI scheduling signaling, i.e., DCI-4, and the NDI was toggled during the period between DCI-4 and DCI-7, so the NDI is determined to be toggled.

DCI-8: the previous DCI is G-RNTI scheduling signaling, i.e., DCI-7, and the values of the NDIs are the same, so the NDI is determined to be not toggled.

Identically, the following DCI is scheduling signaling scrambled with C-RNTI, and whether the NDI is toggled is determined as follows using the above-mentioned method.

DCI-1: the previous DCI is G-RNTI scheduling signaling, and the value of the NDI is the same as the value of the NDI in DCI-1 (both 1), so the NDI is determined to be not toggled.

DCI-2: the previous DCI is C-RNTI scheduling signaling, and the value of the NDI is different from the value of the NDI in DCI-1, so the NDI is determined to be not toggled.

DCI-5: the previous DCI is G-RNTI scheduling signaling, and the value of the NDI is different from the value of the NDI in DCI-4, so the NDI is determined to be toggled.

DCI-6: the previous DCI is C-RNTI scheduling signaling, the value of the NDI is the same as the value of the NDI in DCI-, and the lengths of the TBs are the same, so the NDI is determined to be not toggled.

Third Embodiment

For a same HARQ process number, information bits (e.g., a 1-bit MBS indicator) are added in the DCI for unicast scheduling (e.g., the DCI scrambled with the C-RNTI), so as to indicate whether unicast data or MBS data is scheduled by the DCI, thereby to determine whether the NDI is toggled.

For example, 1-bit MBS-PDSCH-indication is added in the DCI, where 0 represents that the MBS PDSCH is scheduled, and 1 represents that no MBS PDSCH is scheduled or unicast PDSCH is scheduled.

Upon the receipt of the first DCI scrambled with the G-RNTI, when the previously-received second DCI is scrambled with the C-RNTI and the MBS-PDSCH-indication in the second DCI is 0, the value of the NDI in the first DCI is compared with the value of the NDI in the second DCI. When the value of the NDI in the first DCI is the same as the value of the NDI in the second DCI, the NDI in the first DCI is determined to be not toggled, and when the values are different, the NDI in the first DCI is determined to be toggled.

When the previously-received second DCI is scrambled with the C-RNTI and the MBS-PDSCH-indication in the second DCI is 1 or the second DCI does not include the MBS-PDSCH-indication, the NDI in the first DCI is determined to be toggled. It should be appreciated that, the unicast scheduling DCI scrambled with the C-RNTI is usually used, and is of various formats; however, the DCI in only one or two formats among them may include the MBS-PDSCH-indication (e.g., the DCI supporting the unicast scheduling is in format 1_0, 1_1 or 1_2, and the DCI supporting the MBS-PDSCH-indication is in only format 1_1).

When the previously-received second DCI is scrambled with the G-RNTI, the value of the NDI in the first DCI is compared with the value of the NDI in the second DCI. When the values are the same, the NDI in the first DCI is determined to be not toggled, and when the values are different, the NDI in the first DCI is determined to be toggled.

For a same HARQ process number, upon the receipt of the first DCI scrambled with the C-RNTI, when the previously-received second DCI is scrambled with the C-RNTI and a value of the MBS-PDSCH-indication in the second DCI is different from a value of the MBS-PDSCH-indication in the first DCI, the NDI in the first DCI is determined to be toggled, regardless of the value of the NDI.

When the previously-received second DCI is scrambled with the C-RNTI and the value of the MBS-PDSCH-indication in the second DCI is the same as the value of the MBS-PDSCH-indication in the first DCI (both 1 or 0), the value of the NDI in the first DCI is compared with the value of the NDI in the second DCI. When the values are the same, the NDI in the first DCI is determined to be not toggled, and when the values are different, the NDI in the first DCI is determined to be toggled.

When the previously-received second DCI is scrambled with the C-RNTI, merely one of the first DCI and the second DCI includes the MBS-PDSCH-indication, and the DCI including the MBS-PDSCH-indication indicates 0 (indicating that the MBS PDSCH is scheduled), the NDI in the first DCI is determined to be toggled. When the DCI including the MBS-PDSCH-indication indicates 1 (indicating that the unicast PDSCH is scheduled), the value of the NDI in the first DCI is compared with the value of the NDI in the second DCI. When the values are the same, the NDI in the first DCI is determined to be not toggled, and when the values are different, the NDI in the first DCI is determined to be toggled.

When the previously-received second DCI is scrambled with the C-RNTI and the first DCI and the second DCI do not include the MBS-PDSCH-indication, the value of the NDI in the first DCI is compared with the value of the NDI in the second DCI. When the values are the same, the NDI in the first DCI is determined to be not toggled, and when the values are different, the NDI in the first DCI is determined to be toggled.

When the previously-received second DCI is scrambled with the G-RNTI, the first DCI includes the MBS-PDSCH-indication and the first DCI including the MBS-PDSCH-indication indicates 0 (indicating that the MBS PDSCH is scheduled), the value of the NDI in the first DCI is compared with the value of the NDI in the second DCI. When the values are the same, the NDI in the first DCI is determined to be not toggled, and when the values are different, the NDI in the first DCI is determined to be toggled. When the first DCI including the MBS-PDSCH-indication indicates 1, the NDI in the first DCI is determined to be toggled.

Based on the above, equivalently, when the unicast scheduling DCI (i.e., the DCI scrambled with the C-RNTI) does not include the MBS-PDSCH-indication, the MBS-PDSCH-indication in the DCI may be considered as 1 (unicast PDSCH). At this time, when the value of the MBS-PDSCH-indication in the first DCI is different from that in the second DCI, the NDI in the first DCI is determined to be toggled, and when the value of the MBS-PDSCH-indication in the first DCI is the same as that in the second DCI, whether the first NDI has been toggled in determined in accordance with whether the values of the NDIs are the same.

When the previously-received second DCI is scrambled with the G-RNTI and the MBS-PDSCH-indication in the first DCI is 0, the value of the NDI in the first DCI is compared with the value of the NDI in the second DCI. When the values are the same, the NDI in the first DCI is determined to be not toggled, and when the values are different, the NDI in the first DCI is determined to be toggled.

When the previously-received second DCI is scrambled with the G-RNTI and the MBS-PDSCH-indication in the first DCI is 1, the NDI in the first DCI is determined to be toggled.

Based on the above-mentioned method, it is able to schedule the retransmission in accordance with the C-RNTI, and then schedule the retransmission in accordance with the G-RNTI. In addition, in the case of the missed detection of the G-RNTI scheduling signaling, when the base station has scheduled the retransmission in accordance with the C-RNTI and schedules the retransmission in accordance with the G-RNTI again, the data may be still determined to be retransmitted, without any loss of the retransmission combination gain.

Figure 5:
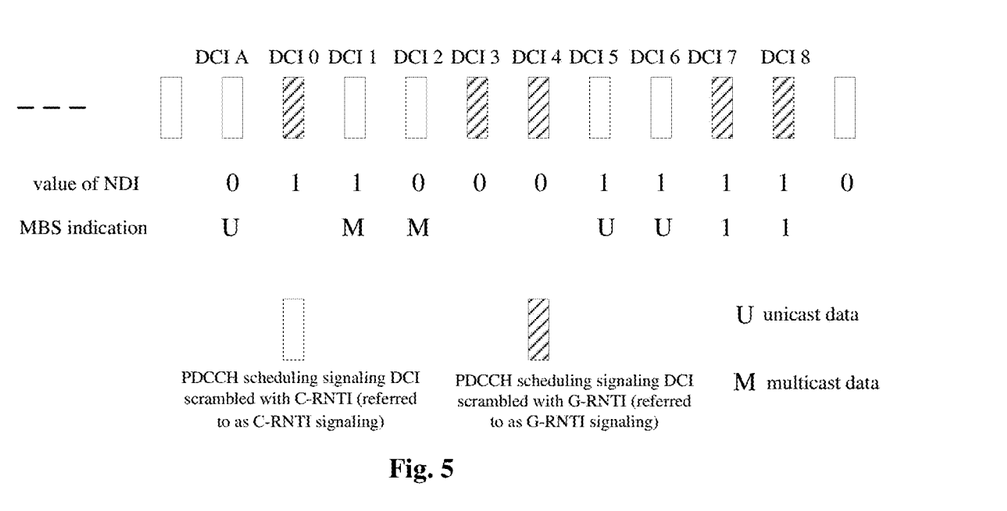
FIG. 5 is a schematic view showing yet another application example of the information transmission processing method according to an embodiment of the present disclosure.

For example, as shown in FIG. 5, the following DCI is scheduling signaling scrambled with the G-RNTI, and whether the NDI is toggled is determined as follows using the above-mentioned method.

DCI-0: it is the G-RNTI scheduling signaling received for the first time, so the NDI is directly determined to be toggled.

DCI-3: the previous DCI-2 is C-RNTI scheduling signaling, the MBS indication indicates the MBS data, and the values of the NDIs are the same, so the NDI is determined to be not toggled.

DCI-4: the previous DCI-3 is G-RNTI scheduling signaling, and the values of the NDIs are the same, so the NDI is determined to be not toggled.

DCI-7: the previous DCI-6 is C-RNTI scheduling signaling, and the MBS indication indicates the unicast data, so the NDI is determined to be toggled.

DCI-8: the previous DCI-7 is G-RNTI scheduling signaling, and the values of the NDIs are the same, so the NDI is determined to be not toggled.

Identically, the following DCI is scheduling signaling scrambled with the C-RNTI, and whether the NDI is toggled is determined as follows using the above-mentioned method (the missed detection occurs for the UE in DCI-0 and DCI-1, i.e., the DCI has been transmitted by the base station but fails to be detected by the UE).

DCI-2: the previous DCI is C-RNTI scheduling signaling (DCI-A), and the values of the MBS-PDSCH-indications in the two DCIs are different, so the NDI is determined to be toggled.

DCI-5: the previous DCI is G-RNTI scheduling signaling, and the MBS indication indicates the unicast data, so the NDI is determined to be toggled.

DCI-6: the previous DCI is C-RNTI scheduling signaling, the values of the MBS-PDSCH-indications in the two DCIs are the same, and the values of the NDIs are the same, so the NDI is determined to be not toggled.

It should be appreciated that, when the MBS-PDSCH-indication indicates the MBS PDSCH data and the PDSCH is received by the UE, the PDSCH data is descrambled using a scrambling code sequence of the PDSCH generated in accordance with the G-RNTI. When the MBS-PDSCH-indication indicates the unicast PDSCH data and the PDSCH is received by the UE, the PDSCH data is descrambled using a scrambling code sequence of the PDSCH generated in accordance with the C-RNTI.

Figure 6:
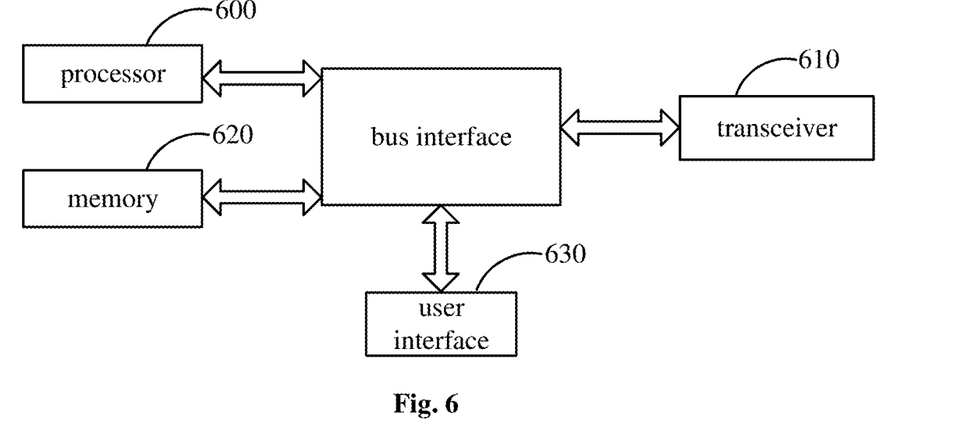
FIG. 6 is a block diagram of a UE according to an embodiment of the present disclosure.

As shown in FIG. 6, the present disclosure further provides in some embodiments a UE, which includes a memory 620, a transceiver 600 and a processor 610. The memory 620 is configured to store therein a program instruction. The transceiver 600 is configured to transmit and receive data under the control of the processor 610. The processor 610 is configured to read the program instruction in the memory 620 so as to: obtain first DCI and first information, the first DCI including a first NDI; determine that the first NDI has been toggled in the case that the first information meets a first condition; and determine that the first NDI has not been toggled in the case that the first information meets a second condition. The first information includes at least one of: a first scrambling RNTI type of the first DCI; a second scrambling RNTI type of second DCI, the second DCI being DCI received before the first DCI; a value of the first NDI in the first DCI; or a value of a second NDI in the second DCI.

In FIG. 6, bus architecture may include a number of buses and bridges connected to each other, so as to connect various circuits for one or more processors 610 and one or more memories 620. In addition, as is known in the art, the bus architecture may be used to connect any other circuits, such as a circuit for a peripheral device, a circuit for a voltage stabilizer and a power management circuit. A bus interface may be provided, and the transceiver 600 may consist of a plurality of elements, i.e., a transmitter and a receiver for communication with any other devices over a transmission medium. The transmission medium includes a wireless channel, a wired channel, or an optical cable. With respect to different UEs, a user interface 630 may also be provided for devices which are to be arranged inside or outside the UE, and these devices may include but not limited to a keypad, a display, a speaker, a microphone and a joystick. The processor 610 may take charge of managing the bus architecture as well as general processings. The memory 620 may store therein data for the operation of the processor 610.

In a possible embodiment of the present disclosure, the processor 610 is a Central Processing Unit (CPU), an Application Specific Integrated Circuit (ASIC), a Field-Programmable Gate Array (FPGA) or a Complex Programmable Logic Device (CPLD). The processor 610 may also use multi-core architecture.

The processor 610 is configured to call the program instruction in the memory, so as to implement the above-mentioned information transmission processing method in accordance with obtained executable instructions. The processor 610 may also be physically separated from the memory 620.

In a possible embodiment of the present disclosure, in the case that the first scrambling RNTI type is C-RNTI and the second scrambling RNTI type is C-RNTI, or the first scrambling RNTI type is G-RNTI and the second scrambling RNTI type is C-RNTI, or the first scrambling RNTI type is C-RNTI and the second scrambling RNTI type is G-RNTI, the first condition includes at least one of that the value of the first NDI is different from the value of the second NDI, or that a size of a first TB scheduled by the first DCI is different from a size of a second TB scheduled by the second DCI, and the second condition includes one of that the value of the first NDI is the same as the value of the second NDI, or that the value of the first NDI is the same as the value of the second NDI and the size of the first TB is the same as the size of the second TB.

In a possible embodiment of the present disclosure, the first condition includes one of that a type of data scheduled by the first DCI is different from a type of data scheduled by the second DCI, or that the type of the data scheduled by the first DCI is the same as the type of the data scheduled by the second DCI and the value of the first NDI is different from the value of the second NDI, and the second condition includes that the type of the data scheduled by the first DCI is the same as the type of the data scheduled by the second DCI and the value of the first NDI is the same as the value of the second NDI.

In a possible embodiment of the present disclosure, a type of data scheduled by DCI is indicated through the DCI, and/or determined in accordance with a scrambling RNTI type of the DCI.

In a possible embodiment of the present disclosure, in the case that the scrambling RNTI type of the DCI is C-RNTI and the DCI includes type indication information, the type of the data scheduled by the DCI is determined in accordance with the type indication information.

According to the UE in the embodiments of the present disclosure, the first DCI and first information are obtained, and the first DCI includes the first NDI. The first NDI is determined to be toggled in the case that the first information meets the first condition, and the first NDI is determined to be not toggled in the case that the first information meets the second condition. The first information includes at least one of: the first scrambling RNTI type of the first DCI; the second scrambling RNTI type of the second DCI, the second DCI being DCI received before the first DCI; the value of the first NDI in the first DCI; or the a value of the second NDI in the second DCI. As a result, it is able to schedule the data using the DCI scrambled with different types of RNTIs in a more flexible and efficient manner, thereby to enable the UE to determine whether the data is transmitted initially or retransmitted in an accurate manner. In addition, it is able to utilize air-interface resources efficiently, thereby to improve the spectrum utilization.

Figure 7:
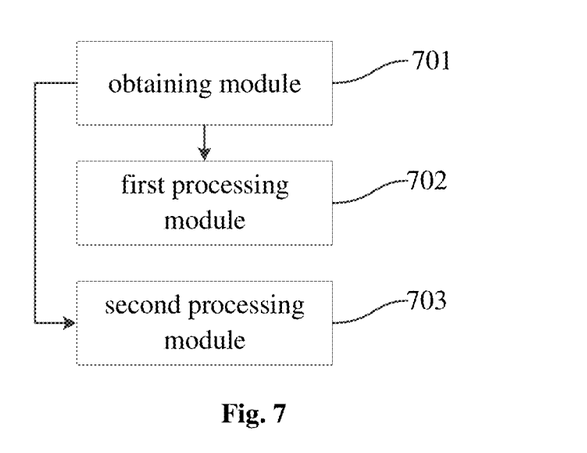
FIG. 7 is a block diagram showing an information transmission processing device according to an embodiment of the present disclosure.

As shown in FIG. 7, the present disclosure further provides in some embodiments an information transmission processing device, which includes: an obtaining module 701 configured to obtain first DCI and first information, the first DCI including a first NDI; a first processing module 702 configured to determine that the first NDI has been toggled in the case that the first information meets a first condition; and a second processing module 703 configured to determine that the first NDI has not been toggled in the case that the first information meets a second condition. The first information includes at least one of: a first scrambling RNTI type of the first DCI; a second scrambling RNTI type of second DCI, the second DCI being DCI received before the first DCI; a value of the first NDI in the first DCI; or a value of a second NDI in the second DCI.

In a possible embodiment of the present disclosure, in the case that the first scrambling RNTI type is C-RNTI and the second scrambling RNTI type is C-RNTI, or the first scrambling RNTI type is G-RNTI and the second scrambling RNTI type is C-RNTI, or the first scrambling RNTI type is C-RNTI and the second scrambling RNTI type is G-RNTI, the first condition includes at least one of that the value of the first NDI is different from the value of the second NDI, or that a size of a first TB scheduled by the first DCI is different from a size of a second TB scheduled by the second DCI, and the second condition includes one of that the value of the first NDI is the same as the value of the second NDI, or that the value of the first NDI is the same as the value of the second NDI and the size of the first TB is the same as the size of the second TB.

In a possible embodiment of the present disclosure, the first condition includes one of that a type of data scheduled by the first DCI is different from a type of data scheduled by the second DCI, or that the type of the data scheduled by the first DCI is the same as the type of the data scheduled by the second DCI and the value of the first NDI is different from the value of the second NDI, and the second condition includes that the type of the data scheduled by the first DCI is the same as the type of the data scheduled by the second DCI and the value of the first NDI is the same as the value of the second NDI.

In a possible embodiment of the present disclosure, a type of data scheduled by DCI is indicated through the DCI, and/or determined in accordance with a scrambling RNTI type of the DCI.

In a possible embodiment of the present disclosure, in the case that the scrambling RNTI type of the DCI is C-RNTI and the DCI includes type indication information, the type of the data scheduled by the DCI is determined in accordance with the type indication information.

According to the information transmission processing device in the embodiments of the present disclosure, the first DCI and first information are obtained, and the first DCI includes the first NDI. The first NDI is determined to be toggled in the case that the first information meets the first condition, and the first NDI is determined to be not toggled in the case that the first information meets the second condition. The first information includes at least one of: the first scrambling RNTI type of the first DCI; the second scrambling RNTI type of the second DCI, the second DCI being DCI received before the first DCI; the value of the first NDI in the first DCI; or the a value of the second NDI in the second DCI. As a result, it is able to schedule the data using the DCI scrambled with different types of RNTIs in a more flexible and efficient manner, thereby to enable the UE to determine whether the data is transmitted initially or retransmitted in an accurate manner. In addition, it is able to utilize air-interface resources efficiently, thereby to improve the spectrum utilization.

It should be appreciated that, the device in the embodiments of the present disclosure is used to implement all the steps of the above-mentioned method with a same technical effect, which will not be repeatedly defined herein.

It should be appreciated that, the units in the embodiments of the present disclosure are for illustrative purposes, and they are provided merely on the basis of their logic functions. The units may be integrated in a processing unit, or physically separated from each other, or two or more units may be integrated in one unit. The integrated units may be implemented in the form of hardware or a software functional unit.

In the case that the functional units are implemented in a software form and sold or used as a separate product, they may be stored in a computer-readable medium. Based on this, the technical solutions of the present disclosure, partial or full, or parts of the technical solutions of the present disclosure contributing to the related art, may appear in the form of software products, which may be stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

It should be appreciated that, the device in the embodiments of the present disclosure is used to implement all the steps of the above-mentioned method with a same technical effect, which will not be repeatedly defined herein.

The present disclosure further provides in some embodiments a processor-readable storage medium storing therein a program instruction. The program instruction is executed by a processor, so as to: obtain first DCI and first information, the first DCI including a first NDI; determine that the first NDI has been toggled in the case that the first information meets a first condition; and determine that the first NDI has not been toggled in the case that the first information meets a second condition. The first information includes at least one of: a first scrambling RNTI type of the first DCI; a second scrambling RNTI type of second DCI, the second DCI being DCI received before the first DCI; a value of the first NDI in the first DCI; or a value of a second NDI in the second DCI.

The program instruction is executed by the processor so as to implement all the steps of the above-mentioned method at a UE side in FIG. 2 with a same technical effect, which will not be repeatedly defined herein.

Schemes in the embodiments of the present disclosure may be applied to various systems (especially the 5$^{th}$-Generation (5G) system), e.g., Global System of Mobile communication (GSM), Code Division Multiple Access (CDMA) system, Wideband Code Division Multiple Access (WCDMA) system, General Packet Radio Service (GPRS) system, Long Term Evolution (LTE) system, LTE Frequency Division Duplexing (FDD) system, LTE Time Division Duplexing (TDD) system, Long Term Evolution Advanced (LTE-A) system, Universal Mobile Telecommunication System (UMTS), Worldwide Interoperability for Microwave Access (WiMAX) system, or 5$^{th}$-Generation (5G) New Radio (NR) system. Each of these systems includes a terminal device and a network device. Each system may further include a core network part, e.g., an Evolved Packet System (EPS) or 5G system (5GS).

The terminal involved in the embodiments of the present disclosure is a device for providing voice data and/or any other service data to a user, e.g., a handheld device having a wireless connection function, or any other processing device capable of being connected to a wireless modem. In different systems, the terminal device may have different names. For example, in a 5G system, the terminal device is called as User Equipment (UE). A wireless terminal device communicates with one or more Core Networks (CNs) via a Radio Access Network (RAN). The wireless terminal device may be a mobile terminal, e.g., a mobile phone (or cellular phone), or a computer having the mobile terminal device, e.g., a portable, pocket-sized, handheld, built-in or vehicle-mounted mobile device, which are capable of exchanging voice and/or data with the RAN. For example, the wireless terminal device may be a Personal Communication Service (PCS) telephone, a cordless telephone, a Session Initiation Protocol (SIP) phone, a Wireless Local Loop (WLL) station, or a Personal Digital Assistant (PDA). In addition, the wireless terminal device may also be called as system, subscriber unit, subscriber station, mobile station, mobile, remote station, remote terminal, access terminal, user terminal, user agent or user device, which will not be particularly defined herein.

The network device involved in the embodiments of the present disclosure may be a base station which includes a plurality of cells providing services for the terminal. Depending on different application scenarios, the base station is called as an access point, a device in an access network in communication with the wireless terminal device through one or more sectors on an air interface, or any other name. The network device is used to exchange a received air frame with an Internet Protocol (IP) packet, and it serves as a router between the wireless terminal device and the other part of the access network. The other part of the access network includes an IP communication network. The network device may further coordinate attribute management on the air interface. For example, the network device involved in the embodiments of the present disclosure is a Base Transceiver Station (BTS) in the GSM or CDMA system, a NodeB in the WCDMA system, an evolutional Node B (eNB, or e-NodeB) in the LTE system, a 5G base station (gNB) in 5G network architecture (next generation system), a Home evolved Node B (HeNB), a relay node, a femto, or a pico, which will not be particularly defined herein. In some network structures, the network device includes a Centralized Unit (CU) and a Distributed Unit (DU), which may be geographically separated from each other.

Multi Input Multi Output (MIMO) transmission is performed between the network device and the terminal each with one or more antennae, and the MIMO transmission is Single User MIMO (SU-MIMO) or Multiple User MIMO (MU-MIMO). Depending on the form of an antenna combination and the quantity of antennae, the MIMO transmission may be two dimensional-MIMO (2D-MIMO), three dimensional-MIMO (3D-MIMO), Full Dimensional-MIMO (FD-MIMO) or massive-MIMO, and it may also be diversity transmission, precoding transmission or beam-forming transmission.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to a disk memory and an optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicated computer, an embedded processor or any other programmable data processing devices to create a machine, so that instructions capable of being executed by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

It should be appreciated that, for convenience and clarification, the operational procedures of the system, device and units may refer to the above embodiments concerning the method, and thus will not be repeated herein.

It should be further appreciated that, the system, apparatus and method may be implemented in any other ways. For example, the embodiments for the apparatus is merely for illustrative purposes, and the units are provided merely on the basis of their logic functions. During the actual application, some units may be combined together or integrated into another system. Alternatively, some functions of the units may be omitted or not executed. In addition, the coupling connection, direct coupling connection or communication connection between the units may be implemented via interfaces, devices or units, and the indirect coupling connection or communication connection between the units may be implemented in an electrical or mechanical form or in any other form.

The units as separate components may be, or may not be, separated from each other physically, and the components may be, or may not be, physical units. They may be located at an identical position, or distributed over a plurality of network elements. All or parts of the components may be selected in accordance with the practical need so as to achieve the object of the present disclosure.

In addition, the functional units in the embodiments of the present disclosure may be integrated into a processing unit, or the functional units may exist independently, or two or more functional units may be combined together.

Through the above-mentioned description, it may be apparent for a person skilled in the art that the present disclosure may be implemented by software as well as a necessary common hardware platform, or by hardware, and the former may be better in most cases. Based on this, the technical solutions of the present disclosure, partial or full, or parts of the technical solutions of the present disclosure contributing to the related art, may appear in the form of software products, which may be stored in a storage medium (e.g., Read-Only Memory (ROM)/Random Access Memory (RAM), magnetic disk or optical disk) and include several instructions so as to enable a terminal device (mobile phone, computer, server, air conditioner or network device) to execute the method in the embodiments of the present disclosure.

It should be appreciated that, all or parts of the steps in the method may be implemented by related hardware under the control of a computer program. The computer program may be stored in a computer-readable storage medium, and it may be executed so as to implement the steps in the above-mentioned method embodiments. The storage medium may be a magnetic disk, an optical disk, an ROM or an RAM.

It should be appreciated that, the embodiments of the present disclosure may be implemented by hardware, software, firmware, middleware, microcode or a combination thereof. For the hardware implementation, the processor may include one or more of an Application Specific Integrated Circuit (ASIC), a Digital Signal Processor (DSP), a DSP device (DSPD), a Programmable Logic Device (PLD), a Field-Programmable Gate Array (FPGA), a general-purpose processor, a controller, a microcontroller, a microprocessor, any other electronic unit capable of achieving the functions in the present disclosure, or a combination thereof.

For the software implementation, the scheme in the embodiments of the present disclosure may be implemented through modules capable of achieving the functions in the present disclosure (e.g., processes or functions). Software codes may be stored in the memory and executed by the processor. The memory may be implemented inside or outside the processor.

It may be apparent for the person skilled in the art that various modifications and variations may be made to the application without departing from the spirit and scope of the application. Therefore, if these modifications and variations fall within the scope of the claims of the present application and their equivalence, these modifications and variations shall also fail within the protection scope of the present disclosure.

What is claimed is:

1. An information transmission processing method for a User Equipment (UE), comprising:
   obtaining first Downlink Control Information (DCI) and first information, the first DCI comprising a first New Data Indicator (NDI);
   determining the first NDI to have been toggled in the case that the first information meets a first condition;
   wherein the first information comprises at least one of:
   a first scrambling Radio Network Temporary Identity (RNTI) type of the first DCI;
   a second scrambling RNTI type of second DCI, the second DCI being DCI received before the first DCI;
   a value of the first NDI in the first DCI;
   a value of a second NDI in the second DCI;
   in the case that the first scrambling RNTI type is Cell specific Radio Network Temporary Identity (C-RNTI) and the second scrambling RNTI type is Group common Radio Network Temporary Identity (G-RNTI), the first condition comprises at least one of:
   that the value of the first NDI is different from the value of the second NDI;
   that a size of a first Transport Block (TB) scheduled by the first DCI is different from a size of a second TB scheduled by the second DCI;
   or,
   in the case that the first scrambling RNTI type is G-RNTI and the second scrambling RNTI type is C-RNTI, determining the first NDI to have been toggled directly;
   or,
   in the case that the first scrambling RNTI type is G-RNTI and the second scrambling RNTI type is G-RNTI, the first condition comprises:
   that the value of the first NDI is different from the value of the second NDI.

2. The information transmission processing method according to claim 1, wherein the first condition further comprises one of:
   that a type of data scheduled by the first DCI is different from a type of data scheduled by the second DCI;
   that the type of the data scheduled by the first DCI is the same as the type of the data scheduled by the second DCI, and the value of the first NDI is different from the value of the second NDI.

3. The information transmission processing method according to claim 2, wherein a type of data scheduled by DCI is indicated through the DCI, and/or the type of data scheduled by the DCI is determined in accordance with a scrambling RNTI type of the DCI.

4. The information transmission processing method according to claim 3, wherein in the case that the scrambling RNTI type of the DCI is C-RNTI and the DCI comprises type indication information, the type of the data scheduled by the DCI is determined in accordance with the type indication information.

5. The information transmission processing method according to claim 1, wherein the first condition further comprises:
that the first scrambling RNTI type is G-RNTI, the second scrambling RNTI type is C-RNTI, and at least one NDI is toggled during a period that is from a time when third DCI is received to a time when the first DCI is received, and the third DCI is DCI scrambled with the G-RNTI and received before the first DCI.

6. A UE, comprising a memory, a transceiver and a processor, wherein the memory is configured to store therein a program instruction; the transceiver is configured to transmit and receive data under the control of the processor;
the processor is configured to read the program instruction in the memory to:
obtain first DCI and first information, the first DCI comprising a first NDI;
determine the first NDI to have been toggled in the case that the first information meets a first condition;
wherein the first information comprises at least one of:
a first scrambling RNTI type of the first DCI;
a second scrambling RNTI type of second DCI, the second DCI being DCI received before the first DCI;
a value of the first NDI in the first DCI;
a value of a second NDI in the second DCI;
in the case that the first scrambling RNTI type is C-RNTI and the second scrambling RNTI type is G-RNTI, the first condition comprises at least one of:
that the value of the first NDI is different from the value of the second NDI;
that a size of a first TB scheduled by the first DCI is different from a size of a second TB scheduled by the second DCI;
or,
in the case that the first scrambling RNTI type is G-RNTI and the second scrambling RNTI type is C-RNTI, the first NDI is determined directly to have been toggled;
or,
in the case that the first scrambling RNTI type is G-RNTI and the second scrambling RNTI type is G-RNTI, the first condition comprises:
that the value of the first NDI is different from the value of the second NDI.

7. The UE according to claim 6, wherein the first condition further comprises one of:
that a type of data scheduled by the first DCI is different from a type of data scheduled by the second DCI;
that the type of the data scheduled by the first DCI is the same as the type of the data scheduled by the second DCI, and the value of the first NDI is different from the value of the second NDI.

8. The UE according to claim 7, wherein a type of data scheduled by DCI is indicated through the DCI, and/or the type of data scheduled by the DCI is determined in accordance with a scrambling RNTI type of the DCI.

9. The UE according to claim 8, wherein in the case that the scrambling RNTI type of the DCI is C-RNTI and the DCI comprises type indication information, the type of the data scheduled by the DCI is determined in accordance with the type indication information.

10. The UE according to claim 6, wherein the first condition further comprises:
that the first scrambling RNTI type is G-RNTI, the second scrambling RNTI type is C-RNTI, and at least one NDI is toggled during a period that is from a time when third DCI is received to a time when the first DCI is received, and the third DCI is DCI scrambled with the G-RNTI and received before the first DCI.

11. A processor-readable storage medium storing therein a program instruction, wherein the program instruction is used to be executed by a processor to:
obtain first DCI and first information, the first DCI comprising a first NDI;
determine the first NDI to have been toggled in the case that the first information meets a first condition;
wherein the first information comprises at least one of:
a first scrambling RNTI type of the first DCI;
a second scrambling RNTI type of second DCI, the second DCI being DCI received before the first DCI;
a value of the first NDI in the first DCI;
a value of a second NDI in the second DCI;
in the case that the first scrambling RNTI type is C-RNTI and the second scrambling RNTI type is G-RNTI, the first condition comprises at least one of:
that the value of the first NDI is different from the value of the second NDI;
that a size of a first TB scheduled by the first DCI is different from a size of a second TB scheduled by the second DCI;
or,
in the case that the first scrambling RNTI type is G-RNTI and the second scrambling RNTI type is C-RNTI, the first NDI is determined directly to have been toggled;
or,
in the case that the first scrambling RNTI type is G-RNTI and the second scrambling RNTI type is G-RNTI, the first condition comprises:
that the value of the first NDI is different from the value of the second NDI.

* * * * *